M. D. Whipple.

Cutting Files.

No. 1,881. Reissued Feb. 21, 1865.

Witnesses;

G. Fischmacher

W. W. Stearns.

Inventor:

Milton D. Whipple

N. PETERS, PHOTO-LITHOGRAPHER, WASHINGTON, D. C.

UNITED STATES PATENT OFFICE.

MILTON D. WHIPPLE, OF CAMBRIDGE, MASS., ASSIGNOR, BY MESNE ASSIGNMENTS, TO THE WHIPPLE FILE MANUFACTURING COMPANY.

IMPROVEMENT IN MACHINES FOR CUTTING FILES.

Specification forming part of Letters Patent No. 15,867, dated October 7, 1856; Reissue No. 1,881, dated February 21, 1865.

*To all whom it may concern:*

Be it known that I, MILTON D. WHIPPLE, of Cambridge, in the county of Middlesex and State of Massachusetts, have invented certain new and useful Improvements in Machines for Cutting Files, of which the following is a full, clear, and exact description, reference being had to the annexed drawings, in which—

Figure 1:
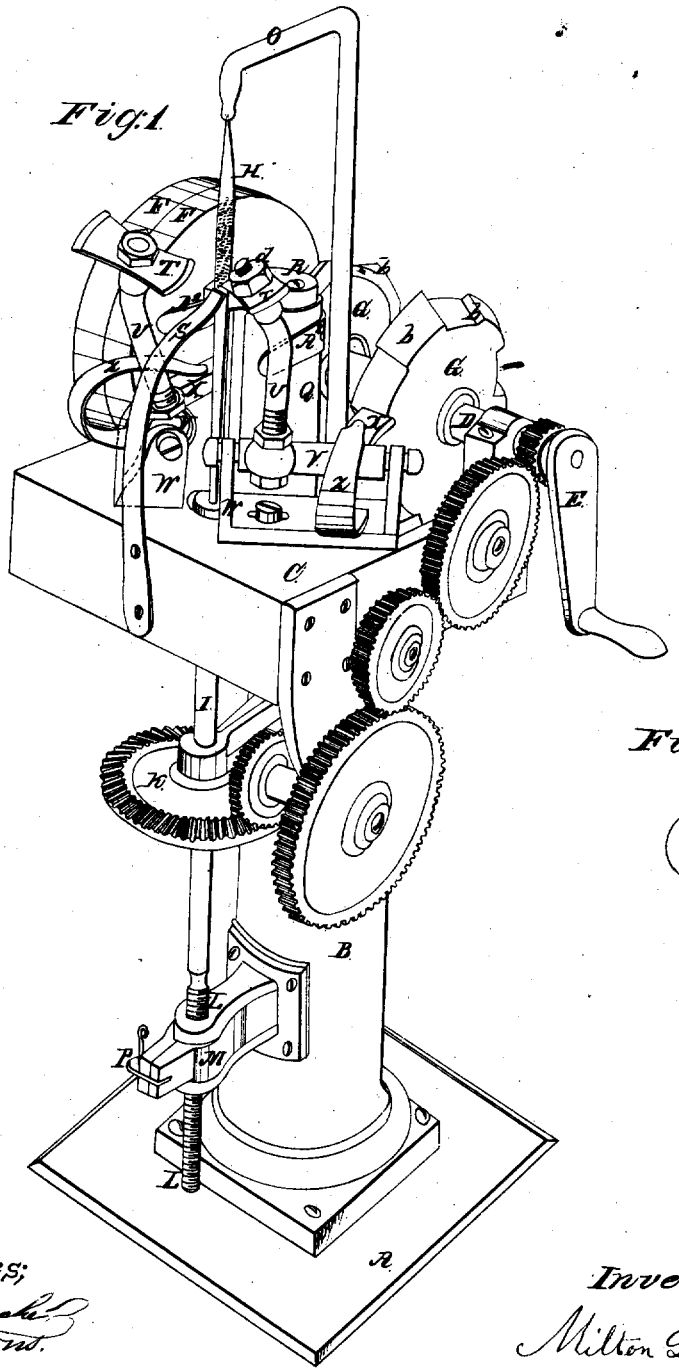
Figure 2:
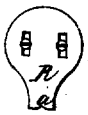

Figure 1 is a perspective view of the machine; Fig. 2, a plan of the bed or rest which sustains the blank while it is cut.

Round files, as heretofore cut, have their teeth formed in rows parallel with the axis of the file, and in order to finish up a round hole it becomes necessary to turn the file constantly as it is operated.

My invention has for its object to produce a file with teeth formed in rows running spirally around it; and it consists in turning the file upon its axis and at the same time feeding it forward as it is cut, whereby spiral rows of teeth are formed around the file, as will be hereinafter more fully described; secondly, where the blank is confined by a set-screw or other rigid contrivance while being cut much time is required to replace the blank, and this particularly occurs when the blanks vary in size. To obviate this inconvenience and to enable the machine to instantly adjust itself to any length of blank is the object of the second part of my invention, which consists in holding one end of the blank by a device controlled by weight, so that it may be readily moved to any required distance by hand; but will instantly adjust itself to the blank, and will yield as the blank is fed and the cutting proceeds; and my invention also consists in supporting the file when held in a vertical or nearly so position upon a bed immediately beneath the point where the cut is made, whereby the thread of the finished portion of the file is protected from the injury which would result from allowing it to bear directly against the bed; and my invention furthermore consists in certain details, which will be more fully set forth hereinafter.

To enable others skilled in the art to understand and use my invention, I will proceed to describe the manner in which I have carried it out.

In the accompanying drawings, A is the foundation or base, from which rises the vertical post B, near the top of which is secured the table C, that sustains the operating parts of the machine. The driving-shaft D is actuated by power applied to the crank E or to the pulley F. To this shaft are secured the wiper-wheels G, which actuate the cutting-chisels. The file-blank H to be cut is sustained at its lower end in the vertical shaft I, that is caused to revolve by the bevel-wheel K, through which it slides with a spline, the screw L working in the nut M, by which means the shaft, together with the blank which it carries, is gradually raised as it is revolved. The nut M is made in two parts, which are secured together by the latch and pin P, and may be separated whenever it is necessary to drop the shaft preparatory to beginning with a new file-blank.

The upper end of the blank rests in a cavity in the end of the bent rod O, which slides freely up and down in the post B, whereby the rod O is caused to descend upon the end of the blank, whatever may be the length of the latter, and as the blank is fed up by the screw L the rod presses upon it and holds it in place by its weight. By thus supporting the end of the file-blank in a socket that is free to move with it I am enabled to fix instantly in position blanks of various lengths, it being only necessary to raise the rod and insert a fresh blank after each operation.

During the operation of cutting the blank is sustained in an angular or semicircular bearing, *a*, Fig. 2, in the bed R, which is secured to the top of the post Q, rising from the table C. The blank, while being cut, is held against the bed by the spring S. The cutters T are carried by helves U, secured to the vibrating axles V. These axles are sustained in the standards W, rising from the table C, and have each a projecting arm, X, that rests upon the periphery of the wheel G, and down upon which it is pressed by a spring, Z. As the wheels G revolve their wipers *b* raise the arms X, and as the latter escape from off the wipers the cutters are thrown against the file-blank by the springs Z for the purpose of making the cuts.

$A^2$ are springs, secured to the post Q, which receive the cutter-helves as they are projected and throw them off from the file as soon as the cut is completed.

It is evident that a lighter blow will be required upon the small portion of the file than upon the larger, as a small cut is to be made, and this is effected by means of the springs $A^2$. The cutters having a longer distance to travel to reach the small portion of the file, will be more resisted by the springs and lighter blows will be transmitted to the blank.

Were the file permitted to rest against a solid bed directly opposite to the point where the cut is made, it would be defaced as fast as cut. To remedy this the cut is made at a point directly beyond that at which the blank is supported, and thus the uncut portion of the blank only is allowed to rest upon the bed.

The cutting-edges of the cutters T are circular, or may be formed of only portions of circles. When dulled at one point, they may be instantly shifted by loosening the nuts *d* and revolving them a short distance. If made entirely circular, or even when they are formed of only portions of a circle, as in the machine represented in the accompanying drawings, they may be shifted around as they are dulled, and may be easily ground by hand or sharpened in a lathe.

What I claim as my invention, and desire to secure by Letters Patent, is—

1. Feeding the blank forward and rotating it upon its axis as the cutting proceeds when it is operated upon by the vibrating cutters in the manner substantially as herein set forth.

2. Supporting one end of the blank in a socket that is free to move with it, and to accommodate itself to blanks of various lengths, substantially as set forth.

3. In combination with a round blank that is rotated for the purpose described, operating upon the blank immediately beyond its point of support in the manner and for the purpose substantially as herein described.

4. The method herein described of operating the cutters by means of the wipers *b* and the springs $A^2$ and Z, whereby the force of the blow is diminished as the size of the blank decreases, as set forth.

5. Forming the cutters of circular disks, or of portions thereof, in the manner and for the purpose substantially as herein set forth.

MILTON D. WHIPPLE.

Witnesses:
P. E. TESCHEMACHER,
N. W. STEARNS.